United States Patent Office 3,528,053
Patented Sept. 8, 1970

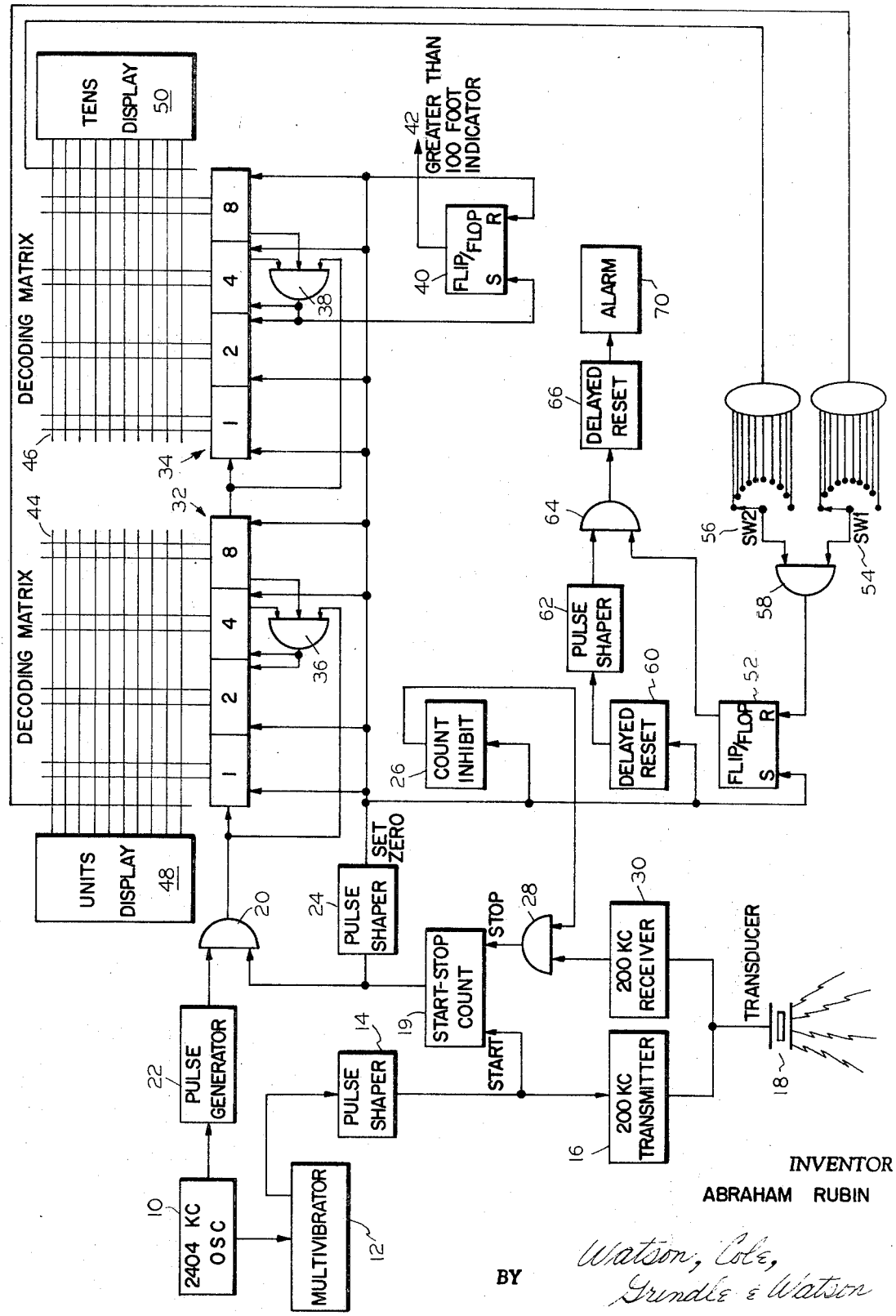

3,528,053
APPARATUS FOR A DEPTH INDICATOR
Abraham Rubin, 508 E. Gravers Lane,
Wyndmoor, Pa. 19118
Filed Mar. 26, 1969, Ser. No. 810,545
Int. Cl. G01s 9/68
U.S. Cl. 340—3     3 Claims

ABSTRACT OF THE DISCLOSURE

A water depth indicator wherein the actual depth in feet is periodically counted and displayed by digital counting and display circuitry and an alarm signal is generated by the detection of a depth below a minimum level. The minimum depth level is preset into a switch connected to periodically received signals indicative of the actual water depth and gate the depth signals to an alarm signal generating circuit.

---

This invention relates to apparatus for indicating water depth and, more particularly, to digital apparatus providing a visual digital indication of water depth and an alarm which indicates that the water depth is minimal or less than a desired or preset depth.

Known analog-type depth finders commonly use a flashing neon bulb or chart recorder as an output indication device and such instruments are subject to a misinterpretation of the displayed water depth by virtue of such phenomena as parallax, unstable indicator movement, and other problems generally associated with the reading of an indicator scale output. Such instruments also require essentially constant surveillance and have a limited reliability because of the moving part mechanisms which they employ.

Digital-type depth finders having a visible output display are also known; however, the prior art digital depth finders tend to utilize complex and costly electronic circuitry. Furthermore, because of their complexity, they have less than a desired reliability and require the attention of a skilled operator. Furthermore, there is a need for a simple digital depth indicator that will also function to provide a warning when the water depth is less than a predetermined minimum depth value.

A primary object of this invention is to provide an improved, less complex and more reliable all-electronic digital depth indicator which affords a visible, digital display of the water depth as well as a minimum water depth alarm signal.

Another object of the invention is to provide a depth indicator of the type described which provides an automatic, repetitive alarm signal of water depths shallower than a preset or desired depth.

And yet another object of this invention is to provide a depth indicator of the type specified which provides both an improved display of water depth than prior art depth indicators, and an alarm signal for announcing depths shallower than a present depth which operates in conjunction with the visual depth display device.

In accordance with the invention, a stable oscillator provides signals for repetitively exciting a sonar transducer, and reference pulses to be used in the counting circuitry. A flip-flop circuit is used to provide a signal to gate the oscillator pulses to a series of decade counters and inhibit means are provided to prevent the counters from receiving pulses during the transmission periods of the transducer. The gating of pulses ceases when the reflected sonar pulses are detected and the accumulated pulses in the counter represent the water depth for that particular sounding. Each digit stage of the respective decade counter stages provides an output signal to an associated decoding matrix which, in turn, produces the necessary excitation of a visual, digital display apparatus. The decoding matrices each also provide an output signal to a respective associated switching device which is capable of being preset to a value representing a desired minimum water depth. Circuitry is provided for cyclically operating an alarm device in the event that the detected water depth is less than the depth represented by the setting of the swiching device.

The foregoing and furher objects and advantages of the digital depth indicator will be apparent to those skilled in the art from the following description of the apparatus when taken in conjunction with the figure which illustrates a preferred embodiment of the improved digital depth indicator.

Ultrasonic energy travels at the rate of two hundred and eight microseconds per foot in water and, therefore, if allowance is made for the return time of the echo as well as the transmission time of the sonar pulse, the ultrasonic energy requires four hundred and sixteen microseconds to travel one foot and return. Oscillator 10 provides an oscillatory output signal at 2,404 kc., which corresponds to four hundred and sixteen microseconds per cycle. Therefore, with such an oscillation cycle, each oscillation represents one foot of travel of the ultrasonic pulse through the water. Part of the oscillatory output signals from oscillator 10 are used to synchronize multivibrator 12, which is free-running and preferably has an eighty millisecond "on" period and a one second "off" period. The output signals from multivibrator 12, during its "on" period, are shaped by pulse shaper 14, which may consist of a differentiating network, such as an R-C network, to energize transmitter 16, which operates at 200 kc., to activate sonar transducer 18. Transducer 18 may be any transducer known to the art, which generates the necessary burst of 200 kc. energy to provide the sonar pulses which travel through the water, and which receives the reflected sonar energy. Such a transducer is well known to those skilled in the art and has been used in the aforementioned analog depth finders.

Simultaneously with the excitation of transmitter 16, start-stop count circuit 19 enables gate 20 so that the oscillatory signals from oscillator 10, which are converted to a train of pulses by pulse generator 22, are gated to the counter stages. The signal from start-stop count circuit 19, which enables gate 20, also provides a "zero" set signal to the counter stages to clear all the counter stages to zero prior to the next count. Pulse shaper 24 merely shapes the signal from start-stop count circuit 19 and may preferably be a differentiator network, which is well known to those skilled in the art, such as an R-C network.

The "zero" set pulse from pulse shaper 24 is also provided to count inhibit circuit 26, which is a single-shot trigger that closes gate 28 to thereby isolate start-stop count circuit 19 from receiver 30 during the eighty millisecond period when the 200 kg. transmitter pulse is generated by transmitter 16. The burst of ultrasonic energy from transmitter 16 is also coupled into the receiver 30 output and may cause start-stop count circuit 19 to stop the pulse counting at a transmitted pulse rather than at a received pulse. Count inhibit circuit 26 is designed to automatically reset after the eighty millisecond ultrasonic transmission period to open gate 28. When receiver 30 detects the first echo signal from transducer 18, gate 28 will therefore be properly conditioned and start-stop count circuit 19 will block gate 20, thereby preventing the pulses from being gated into the counter circuitry.

Counter stages 32, 34 are preferably of the coded decimal "excess three" type which are known to the art and hence a detailed description of their operation is not essential to an understanding of the invention. Moreover, those skilled in the art will recognize that any type of coded decimal counter may be used with suitable modification, if necessary, of the counter input interface. Gate circuits 36, 38 in counters 32, 34, respectively, provide the necessary feed back signals to the various stages of the counters in order to provide a ten count from each counter. Counter 32 counts the unit's digits and counter 34 receives the carry signal from counter 32 to provide an accumulation of the ten's digit. Only two counter stages are shown for the purposes of this description; however, those skilled in the art will recognize that any number of counter stages can be added to provide the necessary capacity to count to one hundred, one thousand, etc.

In the embodiment shown in the figure, flip-flop 40 operates from the carry-over from the ten's counter 34 and the output 42 from flip-flop 40 provides an indication of a depth in excess of one hundred feet. Output 42 may be used to activate an output device which may afford either a visual and/or an audio indication of the presence of this signal. It is apparent that with suitable modification of the circuitry this "overdepth" signal could be provided for any desired water depth.

Decoding matrices 44, 46 respectively receive signals from the associated stages of counters 32, 34 to provide output signals to operate units display 48 and tens display 50. The circuitry forming decoding matrices 44, 46 is well known to the art and, consequently, no additional detailed description is necessary for one skilled in the art to practice the invention. For example, decoding matrices 44, 46 may consist of a diode matrix. Units display 48 and tens display 50 may each be of the type of display device known to the art and employing, for example, nixie tubes to indicate the numbers in the respective display stages.

The aforedescribed operation of the depth finding circuitry is repeated during every cycle of multivibrator 12 so that counter stages 32, 34 are re-set every one second (the "off" period of multivibrator 12) and the information is displayed in units display 48 and tens display 50 for one second. It will be apparent to those skilled in the art that the on/off periods of multivibrator 12 may be adjusted to provide a greater or a lesser period during which the information stored in the counter stages is displayed to an operator. Thus, if the "off" cycle of multivibrator 12 is decreased, more depth soundings per second can be displayed to the operator. The eighty millisecond "on" period of multivibrator 12 corresponds to a depth measurement of approximately two hundred feet.

The operation of the audible alarm for depth soundings which are less than a desired depth is accomplished in the following manner. The set "zero" pulse which clears the counter stages to zero prior to each counting cycle also sets flip-flop 52 and delayed reset 60 which has an automatic two-tenths of a second (.2 sec.) reset cycle. Digital switches 54, 56 are capable of being manually set to positions which represent depths from zero to one hundred feet. Additional digital switches may be provided in the event that there are more than two counter stages. Two switches are shown here only for the purposes of describing the manner in which the minimum depth alarm circuit operates. Switch 54 receives output signals indicating each digit of decoding matrix 44 (units digit) and, similarly, switch 56 receives the outputs representing each ten's digit of decoding matrix 46. Each respective output from decoding matrix 44 and 46 is provided to an associated switch position in switches 54, 56, respectively. Thus, the coincidence of the selected switch positions of digital switches 54, 56 with the signals from decoding matrices 44, 46, respectively, will be gated by AND gate 58 to reset flip-flop 52 and inhibit gate 64. The resetting of delayed reset circuit 60 after two-tenths of a second also inhibits gate 64. Pulse shaper 62 shapes the output of delayed reset circuit 60 and may be similar to the previously described shaping circuits. Therefore, if digital switches 54, 56 are set for a lower depth than the actual depth, a signal is generated at gate 58 to reset flip-flop element 52. This will inhibit gate 64 from operating.

If, on the other hand, the actual depth is less than the depth set in digital switches 54 and 56, a signal is not generated at gate 58 and flip-flop 52 is not reset. Under these conditions gate 64 is permissive.

Delayed reset element 60 recovers after two tenths of a second to gate a signal through element 60 to activate the alarm elements 66 and 70. The resetting of delayed reset circuit 60 is gated to delayed reset circuit 66, which has an automatic reset period of one second. Delayed reset circuit 66 provides a suitable signal to activate alarm 70. If the actual depth continues to be less than the switch setting, delayed reset circuit 66 will continuously set and reset, thereby providing a repetitive alarm signal.

Alarm circuit 70 may be an audio alarm, visual alarm or an audio/visual alarm. Preferably, it is an audio alarm to eliminate the necessity of an operator having to constantly observe a visual display indicator. The minimum depth circuit described above provides a simple means to avoid the danger of a ship or boat running aground.

It is recognized that the display apparatus and the alarm circuitry may be remotely located from the location of the aforedescribed electronic counting circuitry to accommodate the convenience and desires of the operator.

Those skilled in the art will recognize other modifications of the apparatus. While a preferred embodiment of the invention has been shown and described, it will be apparent that changes may be made without departing from the principles and spirit of the invention, the scope of which is defined by the appended claims. Accordingly, the foregoing embodiment is to be considered illustrative only, rather than restrictive of the invention, and those modifications which come within the meaning and range of equivalency of the claims are to be included.

Having thus described the invention, what is claimed as new and desired to be secured by Letters Patent is:

1. Apparatus for indicating depth and having a transducer for periodically transmitting sonar type pulses and for receiving echo pulses, comprising;
    means for generating pulses,
    means for periodically gating said pulses only during an interval between a transmitted sonar pulse and an associated echo pulse,
    means for accumulating said gated pulses during each interval and providing output signals indicative of the accumulated pulses,
    means for storing a predetermined depth level and generating an alarm signal in response to said output signals indicating that the actual depth is less than said predetermined depth level,
    said means for generating pulses includes control means for establishing the periodic operation of said means for gating and for clearing said means for accumulating after each said interval, and said means for storing and generating includes,
    trigger means enabled by said control means to provide a delayed trigger pulse, and
    gate means responsive to said output signals to block said trigger pulse only in the event that said stored predetermined depth level is less than said actual depth indicated by said output signals whereby said alarm signal is not generated.

2. Apparatus as in claim 1 wherein said means for establishing the periodic operation of said gate means is synchronized by said means for generating pulses and said means for storing and generating further includes additional trigger means for providing said alarm signal in response to said trigger pulse, said additional trigger means having a delayed reset corresponding to the periodic operation of said gating means.

3. Apparatus as in claim 2 wherein said means for storing and generating further includes adjustable switch means settable to said predetermined depth level and connected to said means for accumulating to pass said output signals in the event that said predetermined depth level is greater than the actual depth represented by said output signals, said gate means includes a flip-flop periodically set by said control means and connected to said switch means to be reset by said output signals, and blocking means responsive to the resetting of said flip-flop to prevent said additional trigger means for receiving said trigger pulse.

References Cited

UNITED STATES PATENTS

| | | | |
|---|---|---|---|
| 2,998,591 | 8/1961 | Lovett | 340—3 X |
| 3,229,245 | 1/1966 | Hurdle et al. | 340—3 |
| 3,307,143 | 2/1967 | Wyse et al. | 340—3 |
| 3,344,421 | 9/1967 | Dildy | 343—7.3 |

FOREIGN PATENTS 790,934  2/1958  Great Britain.

RICHARD A. FARLEY, Primary Examiner

U.S. Cl. X.R.

343—13